(No Model.)
P. SARGENT.
Liquid Measuring Cabinet.
No. 242,375. Patented May 31, 1881.
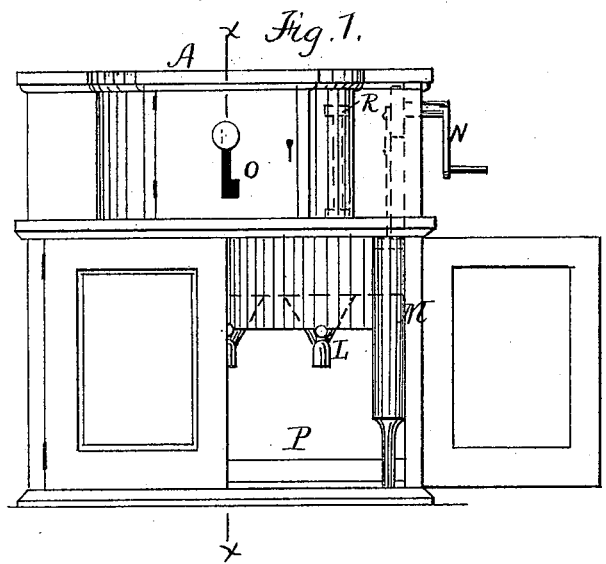
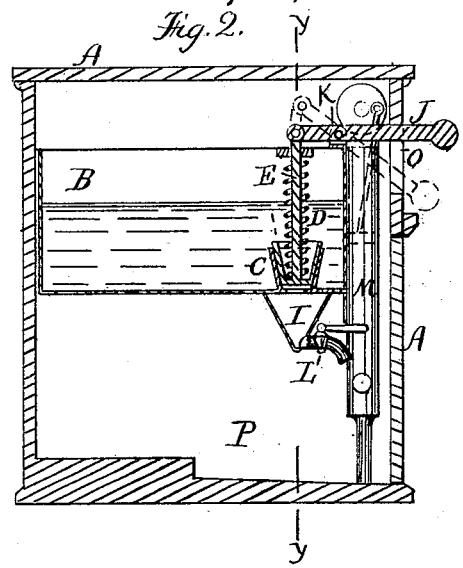
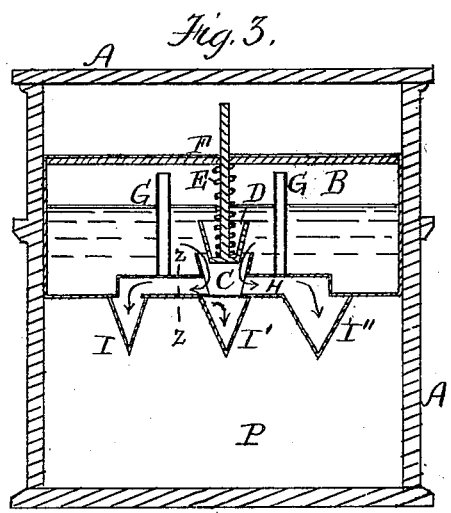
Witnesses.
J. H. Adams
Geo. W. Pierce.
Inventor.
P. Sargent

UNITED STATES PATENT OFFICE.

PRENTICE SARGENT, OF CHELSEA, MASSACHUSETTS.

LIQUID-MEASURING CABINET.

SPECIFICATION forming part of Letters Patent No. 242,375, dated May 31, 1881.

Application filed September 23, 1880. (No model.)

*To all whom it may concern:*

Be it known that I, PRENTICE SARGENT, of Chelsea, in the county of Suffolk and State of Massachusetts, have invented a new and useful Improvement in Self-Measuring Tank and Cabinet, of which the following is a specification.

My invention consists of an apparatus for measuring liquids of any kinds—such as oils, varnishes, &c.—whereby I am enabled to furnish any desired measured quantity as called for, and which shall be self-measuring.

Within a suitable cabinet or casing is arranged a series of measures—such as one or more quarts or gallons—which are filled all at one time, so that the contents of any one of said measures, or of all of them, may be drawn off as required to fill any kind of cans or kegs of corresponding measure.

Referring to the drawings, Figure 1 is a front elevation of an apparatus embodying my invention. Fig. 2 is a vertical section on the line $x\,x$ of Fig. 1. Fig. 3 is a vertical section on the line $y\,y$ of Fig. 2.

A represents a cabinet or casing provided with doors opening above and below to inclose the several portions.

B is a reservoir or tank for holding a supply of the liquid, which is introduced into the tank by means of a pump, M, connecting with a cask or other source of supply. The pump may be of the ordinary lifting kind or a force-pump, and is operated by a crank, N, or other suitable means.

To the bottom of the tank B is attached a conically-shaped shell or cup, C, closed at its lower end, and provided with a series of holes or openings at its sides. To these openings are connected a corresponding series of conduits or passages, H, which radiate from the cup C and lead to the several compartments, I I' I'', attached to the bottom of the tank B. These compartments, in connection with the conduits H, constitute measures of different capacities to hold definite quantities—such as a pint, quart, gallon, &c.—and there may be as many of such measures as can be accommodated by the cup C and the bottom of the tank B. The measures I, &c., are of funnel shape, and are provided with faucets, as shown in Fig. 2, for the discharge of the liquid into cans or other receptacles. The conduit connecting with each separate measure is designed to constitute a part of such measure.

D is a plunger or stopper of corresponding form with the shell or cup C, and is designed to fit closely within the same, so as to close all the openings of conduits H connected with said cup and shut off the supply of liquid to the same, and also to prevent the entrance of liquid into cup C. The plunger D is attached to a rod or stem, E, passing upward through a cross-bar, F, which serves as a guide to the said rod. The plunger D is held down in cup C by means of a coiled spring surrounding the rod E, and bearing on the under side of bar F. The plunger D is raised, when the liquid is to be admitted to the cup C, by means of a lever, J, attached to the rod E and pivoted at $k$. Said lever passes out through a slot, O, in the cabinet, and is held in a depressed position by means of a shoulder in said slot, as seen in Fig. 1.

In filling the several measures the plunger D is raised out of the cup C, which allows the liquid to pass into the cup at the top, whence it flows into and fills all the conduits H and receptacles I, &c. When all are filled the plunger D is dropped down into the cup C, as shown in Fig. 2, so as to completely close the openings to the conduits H, thus rendering each conduit and receptacle I, &c., independent of each other.

When a particular quantity of the liquid is called for—say that in measure I—the faucet of the same is turned, and the contents of such measure are discharged without interfering with any of the other measures, and so with any other particular measure.

It will be observed that all the measures can be filled at one and the same time.

What I claim as my invention is—

The combination, with the reservoir B, of a conically-shaped shell or cup, C, provided with a plunger, D, and connecting with a series of conduits, H, and receptacles I I' I'', &c., whereby the liquid is supplied to the several measures all at one time, substantially as specified.

In testimony whereof I have signed my name to this specification in the presence of two subscribing witnesses.

PRENTICE SARGENT.

Witnesses:
J. H. ADAMS,
F. H. ADAMS.